(12) United States Patent
Kim

(10) Patent No.: US 7,324,432 B1
(45) Date of Patent: Jan. 29, 2008

(54) APPARATUS OF COMPENSATING FOR FREQUENCY OFFSET USING PILOT SYMBOL IN AN ORTHOGONAL FREQUENCY DIVISION MULTIPLEXING SYSTEM

(75) Inventor: Hye-Jeong Kim, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 932 days.

(21) Appl. No.: 10/030,232

(22) PCT Filed: Jul. 5, 2000

(86) PCT No.: PCT/KR00/00723

§ 371 (c)(1),
(2), (4) Date: Apr. 26, 2002

(87) PCT Pub. No.: WO01/03347

PCT Pub. Date: Jan. 11, 2001

(30) Foreign Application Priority Data

Jul. 5, 1999 (KR) ............................. 1999-26862

(51) Int. Cl.
*H04J 11/00* (2006.01)
(52) U.S. Cl. .................. 370/208; 370/210; 375/343; 375/344
(58) Field of Classification Search ........... 370/203, 370/208, 210, 343, 326; 375/344
See application file for complete search history.

(56) References Cited

U.S. PATENT DOCUMENTS

| 5,371,761 | A | * | 12/1994 | Daffara et al. | ............... | 375/326 |
| 5,608,764 | A | * | 3/1997 | Sugita et al. | ............... | 375/344 |
| 5,694,389 | A | * | 12/1997 | Seki et al. | ............... | 370/208 |
| 5,953,311 | A | * | 9/1999 | Davies et al. | ............... | 370/210 |
| 6,058,101 | A | * | 5/2000 | Huang et al. | ............... | 370/208 |
| 6,148,045 | A | * | 11/2000 | Taura et al. | ............... | 375/344 |
| 6,510,133 | B1 | * | 1/2003 | Uesugi | ............... | 370/208 |
| 6,570,943 | B2 | * | 5/2003 | Goldston et al. | ........... | 375/350 |

(Continued)

FOREIGN PATENT DOCUMENTS

JP        04-501348        5/1992

(Continued)

OTHER PUBLICATIONS

Japanese Office Action dated Mar. 2, 2004 issued in a counterpart application, namely; Appln. No. 2001-508092.

*Primary Examiner*—Chi Pham
*Assistant Examiner*—Albert T. Chou
(74) *Attorney, Agent, or Firm*—The Farrell Law Firm, P.C.

(57) ABSTRACT

An apparatus of compensating for a frequency offset using a guard interval and a pilot symbol, which are inserted at a transmitter, in an OFDM (Orthogonal Frequency Division Multiplexing) system. The OFDM system receives an OFDM signal in which a pilot symbol is inserted in data of a frame unit at regular intervals and a guard interval is inserted in a data symbol. In the system, a first carrier synchronizer receives a data symbol stream obtained by converting the OFDM signal to digital data, and detects a guard interval of each data symbol, to compensate for a coarse frequency offset. A fast Fourier transform part OFDM-demodulates a signal output from the first carrier synchronizer. A second carrier synchronizer detects the pilot symbol from the demodulated data symbol stream to compensate for a fine frequency error.

5 Claims, 8 Drawing Sheets

U.S. PATENT DOCUMENTS

| | | | |
|---|---|---|---|
| 6,618,352 B1 * | 9/2003 | Shirakata et al. | 370/203 |
| 6,618,452 B1 * | 9/2003 | Huber et al. | 375/343 |
| 6,731,594 B1 * | 5/2004 | Bohnke | 370/208 |
| 7,058,002 B1 * | 6/2006 | Kumagai et al. | 370/203 |

FOREIGN PATENT DOCUMENTS

| | | |
|---|---|---|
| JP | 05-219021 | 8/1993 |
| JP | 06-318926 | 11/1994 |
| JP | 08-079217 | 3/1996 |
| JP | 08-321820 | 12/1996 |
| JP | 09-502318 | 4/1997 |
| KR | P1999-003705 | 1/1999 |

* cited by examiner

APPARATUS OF COMPENSATING FOR FREQUENCY OFFSET USING PILOT SYMBOL IN AN ORTHOGONAL FREQUENCY DIVISION MULTIPLEXING SYSTEM

BACKGROUND OF THE INVENTION

1. Field of the Invention

The present invention relates generally to a frequency offset compensation apparatus for an OFDM/CDMA (Orthogonal Frequency Division Multiplexing/Code Division Multiple Access) system, and in particular, to a frequency offset compensation apparatus which compensates for a frequency offset (or frequency error) using a guard interval and a pilot symbol.

2. Description of the Related Art

As the types of the recent multimedia services are diversified, it is necessary to transmit data at high speed. In addition, as the user's demand for construction of a wireless network increases, a wireless asynchronous transmission mode (hereinafter, referred to as "WATM") market is expanded. Thus, every country forms various organizations for WATM standardization to expedite implementation of the WATM technology. For implementation of such a high-speed data transmission technology, active researches are being carried out on a method for using the orthogonal frequency division multiplexing (hereinafter, referred to as "OFDM") technology in implementing the high-speed data transmission. In the OFDM technology, data is transmitted on a plurality of subcarriers after inverse fast Fourier transform (IFFT), and the transmitted subcarriers are converted to the original data in an OFDM receiver through fast Fourier transform (FFT).

FIG. 1 illustrates a structure of a general OFDM/CDMA system. With reference to FIG. 1, a description will be made of the structure and operation of a transceiver in the OFDM/CDMA system.

First, the structure of a transmitter will be described. A spreader 101 spreads data symbol streams to be transmitted by multiplying the data symbol streams by a code of an N rate in a data symbol unit. Herein, N data bits obtained by multiplying the data symbol by the code of N rate will be referred to as "data samples". The N data samples spread from the data symbol are parallelized by a serial-to-parallel (S/P) converter 103 and then, input to a pilot sample inserter 105. The pilot sample inserter 105 receives the N data samples in parallel, punctures the received data samples at regular intervals, and then inserts pilot data samples as shown in FIG. 2, and the pilot sample-inserted data symbol is provided to an inverse fast Fourier transform (IFFT) section 107. The IFFT 107 receives in parallel the pilot sample-inserted data samples in the data symbol unit and performs inverse fast Fourier transform on the received data samples. In the following description, the IFFT-transformed data output from the IFFT 107 will be referred to as "OFDM symbol". The OFDM symbol is also comprised of N data samples. The OFDM symbol output from the IFFT 107 is input to a guard interval inserter 109. The guard interval inserter 109 copies a part of the rear end of the received OFDM symbol and inserts it in the front of the OFDM symbol. The guard interval-inserted OFDM symbol is converted to an analog OFDM symbol by a digital-to-analog converter (DAC) 111 and the converted analog OFDM symbol is transmitted after up-conversion.

Next, a receiver down-converts the analog signal transmitted from the transmitter. Because of the inaccuracy of an oscillator used during the down-conversion, the baseband signal includes a frequency offset. The analog signal is converted to a digital OFDM symbol by an analog-to-digital converter (ADC) 121 and then, applied to a guard interval remover 123. The guard interval remover 123 frame-synchronizes the OFDM symbol output from the ADC 121, and after frame synchronization, removes the guard interval included in the OFDM symbol, the guard interval-removed OFDM symbol being applied to a fast Fourier transform (FFT) section 125. The FFT 125 FFT-transforms the OFDM symbol output from the guard interval remover 123 and outputs a data symbol. At this point, since a signal is obtained which is shifted by the frequency offset included during the down-conversion, it is difficult to recover the original data. Particularly, in an OFDM/CDMA system where a desired signal is carried at each frequency band, the frequency offset should be correctly estimated and compensated for to recover the original signal. To compensate for the frequency offset, a carrier synchronizer 127 detects a pilot sample from the data symbol output from the FFT 125, and performs carrier synchronization using the detected pilot sample. A despreader 129 despreads the data symbol output from the FFT 125, which was spread into N data samples, and outputs the original data symbol.

The FFT 125 generally recovers the frequency offset using the FFT characteristics shown in Equation (1) below.

$$X[n]W_N^{K_0 n} \leftrightarrow X[k-k_0]\left(W_N = e^{-j\frac{2\pi}{N}}\right) \quad (1)$$

where X[n] is an input signal in a time domain, which is input to the FFT, $W_N^{K_0 n}$ is an offset term, and $X[k-k_0]$ denotes a received signal with a frequency offset, which is shifted by $k_0$ from the transmission signal during down-conversion.

FIG. 2 illustrates a data structure used in the general OFDM/CDMA system, which shows that the pilot data samples are inserted after puncturing N data samples for each data symbol in a specific pattern. Since the pilot data samples are inserted in a specific pattern, Equation (1) is calculated using the pilot data samples and the frequency offset is compensated for by calculating a shift amount $k_0$ of the data calculated by Equation (1).

In an ideal system, since the pilot samples received as shown in Equation (1) are received in a position shifted by $k_0$ samples from the original reference sample position, it is possible to calculate the frequency offset $k_0$ by estimating the shifted value using a correlator. However, in the OFDM/CDMA system, use of the above pilot samples causes such performance degradation as an increase of over 2 times in a data rate, complication of a receiving stage for compensating for the frequency offset, and an increase in a noise level, so that it is difficult to use the pilot samples.

A non-ideal system has the more serious problems. The factors affecting the IFFT-transformed signal include a timing error, a common phase error (CPE) and the noises. In the receiver, a timing error $n_e$ in a time domain, after passing the FFT stage, are expressed by the product of the original signal in the frequency domain and an exponential term. This ultimately affects even the pilot sample value, so that an increase of this value may cause considerable performance degradation of the correlator. Therefore, in the OFDM/CDMA system, it is difficult for the conventional frequency offset compensation method to detect a correct frequency offset value.

SUMMARY OF THE INVENTION

It is, therefore, an object of the present invention to provide a transmitter which inserts pilots (or pilot symbols) of a symbol unit at regular intervals when transmitting a data symbol steam, to enable exact frequency offset correction at a receiver.

It is another object of the present invention to provide a frequency offset compensation apparatus which compensates twice for a frequency offset using a guard interval and a pilot symbol included in received frame data in which pilot symbols are inserted at regular intervals.

To achieve the above object, a transmitter for an OFDM system includes a modulator for OFDM-modulating a received data symbol, a guard interval inserter for inserting a guard interval in the OFDM-modulated data symbol, a pilot symbol inserter for inserting a pilot symbol in the data of frame unit output from the guard interval inserter at regular intervals, and an analog-to-digital converter for converting the data output from the pilot symbol inserter to an analog signal.

To achieve another object, a receiver for an OFDM system, which receives an OFDM signal for which a pilot symbol is inserted in data of a frame unit at regular intervals and a guard interval is inserted in a data symbol, includes a first carrier synchronizer for receiving a data symbol stream obtained by converting the OFDM signal to digital data and compensating for an approximate frequency offset by detecting the guard interval of each data symbol, a fast Fourier transform section for OFDM-demodulating the signal output from the first carrier synchronizer, and a second carrier synchronizer for compensating for a fine frequency offset by detecting the pilot symbol from the demodulated data symbol stream.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
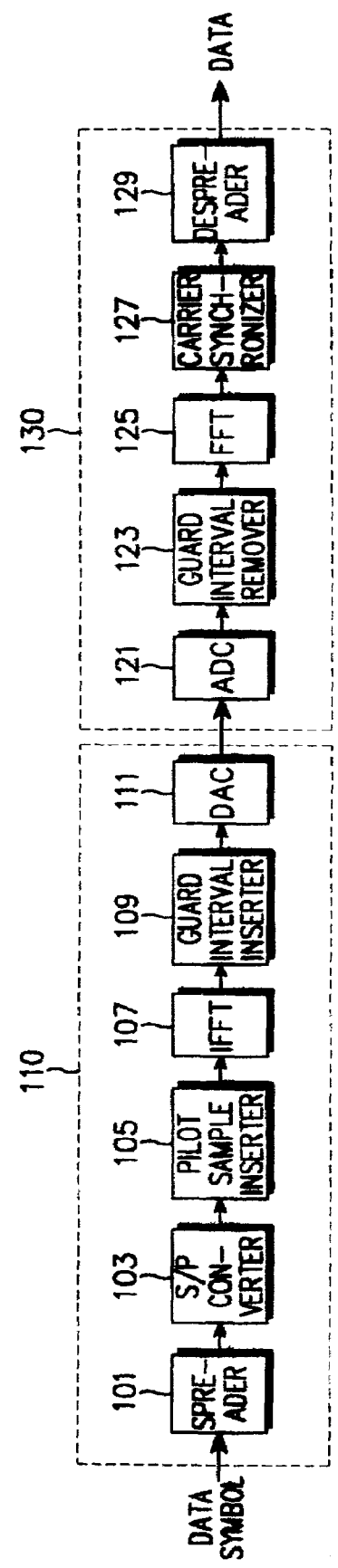
FIG. 1 is a diagram illustrating a structure of a general OFDM/CDMA system.
Figure 2:
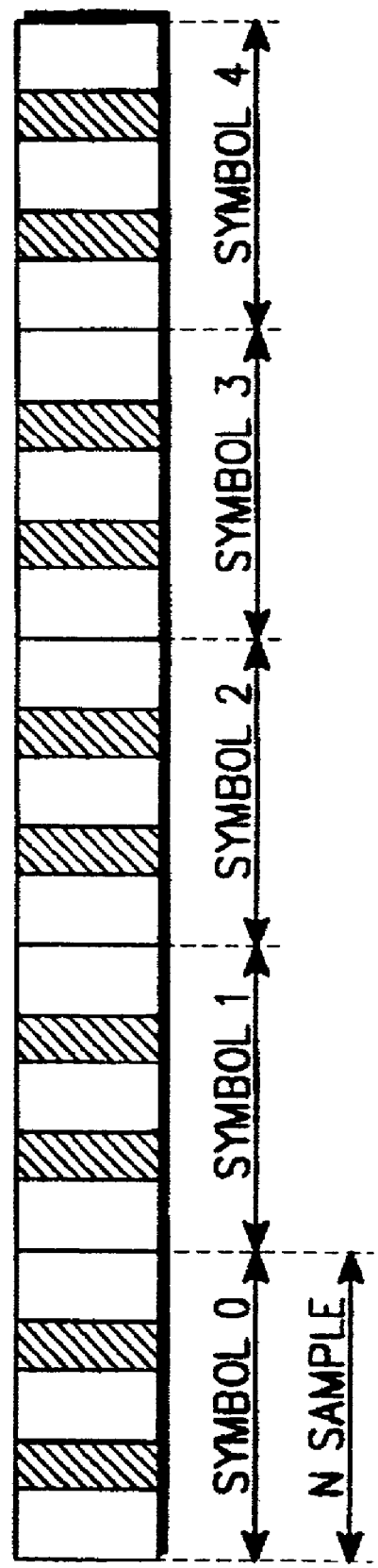
FIG. 2 is a diagram illustrating a data structure using pilot samples in a general OFDM/CDMA system.

A preferred embodiment of the present invention will be described herein below with reference to the accompanying drawings. In the following description, well-known functions or constructions are not described in detail since they would obscure the invention in unnecessary detail.

In an exemplary embodiment of the present invention, a guard interval and a pilot symbol are used to estimate a frequency offset in such actual states as timing error, common phase error and noises. A structure of a transmitter for inserting the guard interval and the pilot symbol before transmission will be described below with reference to FIG. 3.

A serial-to-parallel (S/P) converter 201 receives in series a data symbol, which is spread with a code of length N and comprised of N data samples, and outputs the N data samples in parallel. A pilot symbol inserter 203 receives in parallel the N data samples from the S/P converter 201, and inserts pilot symbols in a frame in a specific pattern before transmission. The pilot symbol inserter 203 can be comprised of means (not shown) for generating the pilot symbol and switching means (now shown) for switching the data symbol and the pilot symbol according to a specific pattern. The switching means can be comprised of a multiplexer. The pilot symbol inserter 203 can also be positioned in a preceding stage of the S/P converter 201. An inverse fast Fourier transform (IFFT) section 205 receives in parallel the N data samples output from the pilot symbol inserter 203, performs inverse fast Fourier transform on the received data samples, and outputs the IFFT-transformed OFDM symbol to a parallel-to-serial (P/S) converter 207. The IFFT-transformed OFDM symbol is comprised of N data samples. Since the N data samples of the OFDM symbol are OFDM-modulated in the data symbol unit, those are different from the N data samples before the IFFT operation. The P/S converter 207 serializes the IFFT-transformed N data samples and outputs them to a guard interval inserter 209. The guard interval inserter 209 copies a part of the rear end of the OFDM symbol output from the P/S converter 207, and inserts it in the front of the data symbol. In the following description, it will be assumed that the number of data samples in the guard interval is N (the number of data samples)×½.

A digital-to-analog converter (DAC) 213 converts the OFDM symbol output from the guard interval inserter 209 and then up-converts the converted OFDM symbol before transmission.

Figure 4A:
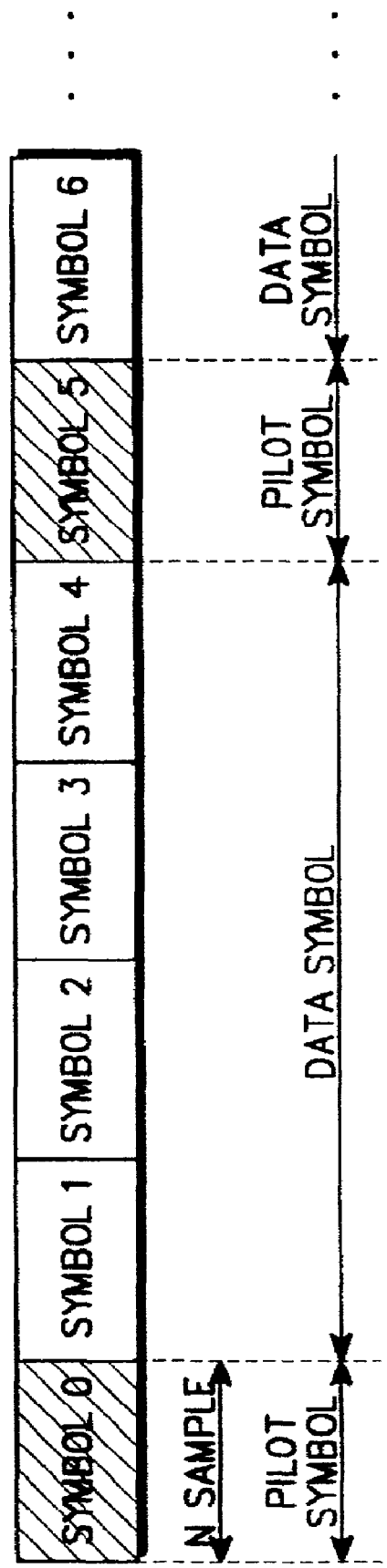
FIG. 4A is a diagram illustrating pilot symbol-inserted frame structure in an OFDM/CDMA system according to an embodiment of the present invention.

FIG. 4A illustrates a pilot symbol-inserted frame structure in an OFDM/CDMA system according to an embodiment of the present invention, wherein the hatched symbols #0 and #5 are the pilot symbols, and the pilot symbols are inserted at intervals of 4 data symbols. The pilot symbols can also be inserted in one frame at regular intervals or inserted at regular intervals without frame separation.

Figure 3:
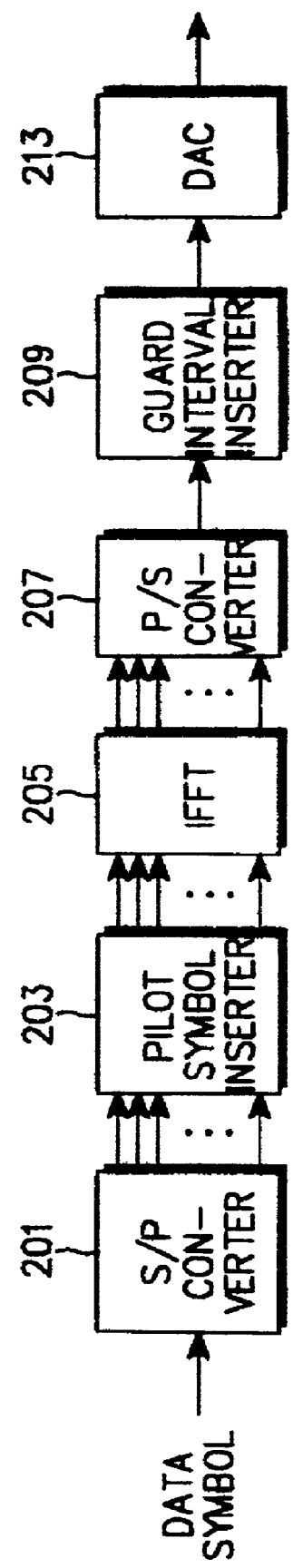
FIG. 3 is a diagram illustrating a structure of a transmitter in an OFDM/CDMA system according to an embodiment of the present invention.
Figure 4B:
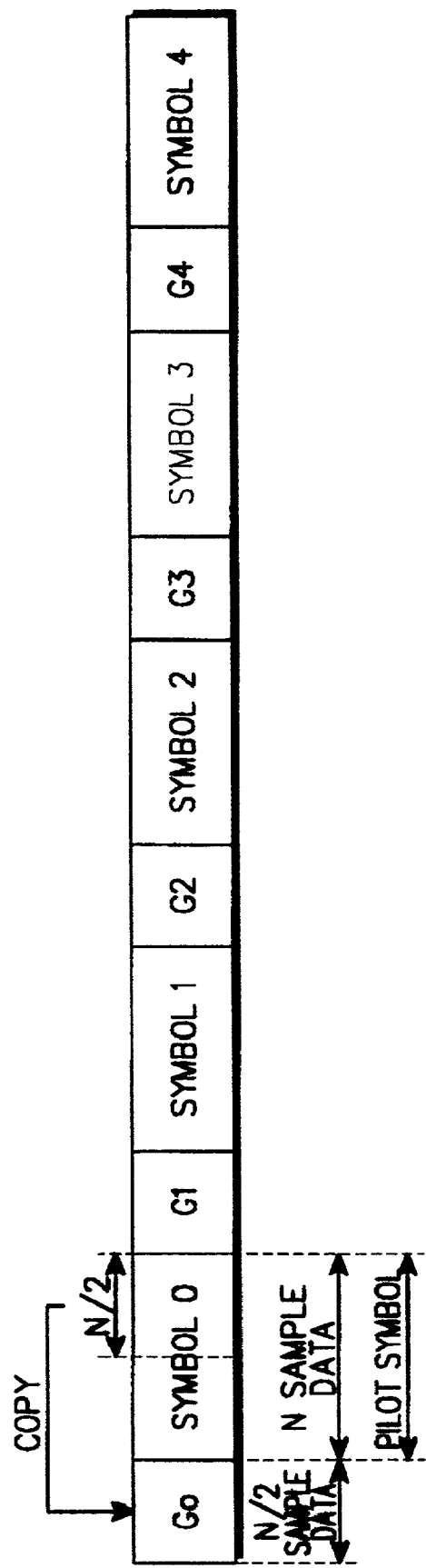
FIG. 4B is a diagram illustrating a guard interval-inserted frame structure in an OFDM/CDMA system according to an embodiment of the present invention.

FIG. 4B illustrates a guard interval-inserted frame structure output from the guard interval inserter 209 of FIG. 3, in an OFDM/CDMA system according to an embodiment of the present invention.

In FIG. 4B, for the guard interval of each OFDM symbol, a part of the rear end of the corresponding OFDM symbol is copied and inserted in the front of the OFDM symbol. In the embodiment of the present invention, a length of the guard interval is determined as ½ the number N of the data samples.

Figure 5:
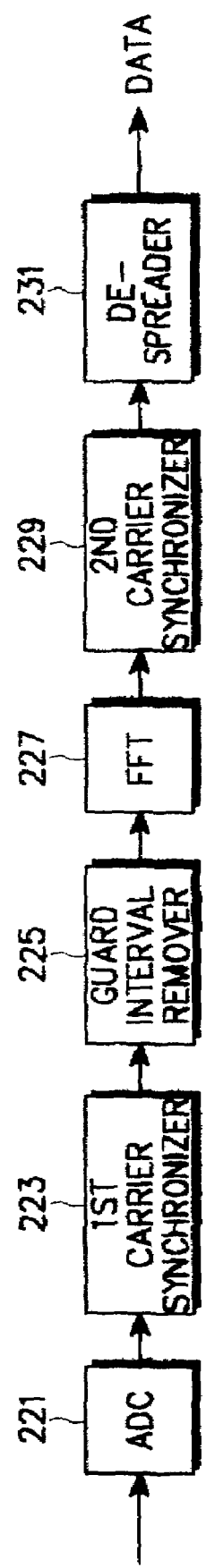
FIG. 5 is a diagram illustrating a structure of a receiver in an OFDM/CDMA system according to an embodiment of the present invention.

FIG. 5 illustrates a structure of a receiver in an OFDM/CDMA system according to an embodiment of the present invention.

In actual circumstances, the receiver of the OFDM/CDMA system has the frequency offset, the common phase error, the noises and the timing error. The signals received in the actual circumstances should be modeled. As illustrated in FIG. 3, if it is assumed that the signal at the input end of the IFFT 205 in the transmitter of the OFDM/CDMA system is $X_m(k)$ and the signal passed the IFFT 205, in which the guard interval is not inserted yet, is $X_m[n]$, a signal FFT-transformed by the receiver after removing $y'_m[n]$ and the guard interval from an analog-to-digital converted signal will be defined as $Y'_m[k]$ in the following description.

If a frequency offset per symbol is $k_e$ [Hz/symbol], then a frequency offset per sample is $k_e/N$ [Hz/sample] and a frequency offset $k_m[n]$ of an $n^{th}$ sample of an $m^{th}$ symbol is expressed by Equation (2) below.

$$k_m[n] = \frac{k_e}{N} m\{N+G\} + \frac{k_e}{N} n \qquad (2)$$

where G denotes the number of samples in the guard interval.

In the receiver, a signal $y_m[n]$ including the frequency offset, the common phase error and the noises is expressed by Equation (3) below, in which for convenience, the number of samples is given from –G to N–1.

$$\begin{aligned}y_m[n] &= X_m[n] \cdot e^{j2\pi k_m[n]} \cdot e^{jP_e} + W_m[n] \\ &= X_m[n] \cdot e^{\frac{j2\pi k_e[m\{N+G\}+n]}{N}} \cdot e^{jP_e} + W_m[n] \\ &= X_m[n] \cdot e^{j2\pi k_e \frac{n}{N}} \cdot e^{\frac{j2\pi k_e m\{N+G\}}{N}} \cdot e^{jP_e} + W_m[n]\end{aligned} \qquad (3)$$

where $P_e$ denotes the common phase error and $W_m[n]$ denotes AWGN (Additive White Gaussian Noise) of the $m^{th}$ symbol.

Now, the structure and operation of the receiver will be described with reference to FIG. 5. An analog-to-digital converter (ADC) 221 down-converts the analog signal transmitted from the transmitter and converts the down-converted analog signal to a digital OFDM symbol. In the following description, the signal output from the ADC 221 will be defined as $y'_m[n]$. A first carrier synchronizer 223 is a carrier synchronizer which uses the guard interval. The first carrier synchronizer 223 receives the OFDM symbol output from the ADC 221, detects a guard interval G of the FODM symbol and G data samples (hereinafter, referred to as copied data samples) at the rear end of the data symbol used to insert the guard interval, and performs frequency synchronization by compensating for the frequency offset of the OFDM symbol output from the ADC 221 using the guard interval and the data samples copied to generate the guard interval. In the embodiment of the present invention, the number G of the data samples in the guard interval is ½ the number N of the data samples of the data symbol. If a signal of the guard interval, i.e., the guard interval comprised of the G data samples inserted in the front of the $m^{th}$ OFDM symbol is defined as $G_m[n]$ and the last G data samples of the OFDM symbol, i.e., the data samples copied to create the guard interval is defined as $R_m[n]$, then $G_m[n]$ and $R_m[n]$ can be expressed by Equation (4) below.

$$\begin{aligned}G_m[n] &= y_m[n-G] \cdot e^{\frac{j2\pi k_e[n-G]}{N}} \cdot \\ & \quad e^{\frac{j2\pi k_e[n+G]}{N}} \cdot e^{jP_e} + W_m[n-G] \\ R_m[n] &= y_m[n+N-G] \cdot e^{\frac{j2\pi k_e[n+N-G]}{N}} \cdot \\ & \quad e^{\frac{j2\pi k_e[n+N+G]}{N}} \cdot e^{jP_e} + W_m[n+N-G]\end{aligned} \qquad (4)$$

A detailed description will be made of a carrier synchronizing operation using the guard interval of the first carrier synchronizer 223 in accordance with Equations (2) to (4). The first carrier synchronizer 223 detects phases of the $G_m[n]$ and $R_m[n]$, and calculates a phase difference between the detected phases of $G_m[n]$ and $R_m[n]$. The phase difference between $G_m[n]$ and $R_m[n]$ is expressed by Equation (5) below.

$$\begin{aligned}\angle G_m[n] &= \angle X_m[n-G] + \frac{2\pi k_e[n-G]}{N} + \\ & \quad \frac{2\pi k_e m[N+G]}{N} + P_e + \angle W_m[n-G] \\ \angle R_m[n] &= \angle X_m[n+N-G] + \frac{2\pi k_e[n+N-G]}{N} + \\ & \quad \frac{2\pi k_e m[N+G]}{N} + P_e + \angle W_m[n+N-G] \\ \angle R_m[n] - \angle G_m[n] &= \angle X_m[n+N-G] - \angle X_m[n-G] + \\ & \quad \frac{2\pi k_e[n+N-G]}{N} - \frac{2\pi k_e[n-G]}{N} + \\ & \quad \angle W_m[n+N-G] - W_m[n-G] \\ &= 2\pi k_e + \angle W_m[n+N-G] - \angle W_m[n-G]\end{aligned} \qquad (5)$$

In Equation (5), $X_m[n+N+G]$ and $X_m[n-G]$ are the identical signal, so that the phase difference is '0'.

When the phase difference between $G_m[n]$ and $R_m[n]$ is calculated from Equation (5), the first carrier synchronizer 223 calculates an average value of the phase difference using Equation (6) below. The first carrier synchronizer 223 performs carrier synchronization by approximately compensating for the frequency offset of the data input from the ADC 221 based on the calculated average value.

$$k_e = \frac{\text{avg}\{\angle R_m[n] - \angle G_m[n]\}}{2\pi}, \qquad (6)$$

Here, if there exists a timing error, there is a case where Equations (2) to (6) are not correct. If the timing error such as an FFT start point detection error and a timing frequency offset is $n_e$, a signal $y'_m[n]$ including the timing error can be expressed by Equation (7) below.

$$\begin{aligned}y_{m'} &= y_m[n-n_e] \\ &= X_m[n-n_e] \cdot e^{\frac{jwpik_e[n-n_e]}{N}} \cdot e^{\frac{j2\pi k_e[n+G]}{N}} \cdot \\ & \quad e^{jP_e} + W_m[n-n_e]\end{aligned} \qquad (7)$$

Here, $y'_m[n]$ includes data samples of the $(m-1)^{th}$ OFDM symbol or the $(m+1)^{th}$ OFDM symbol according to the value of $n_e$. On the above assumption, the phase difference of the respective samples is calculated by Equation (8) below.

$$\angle R_m[n] - \angle G_m[n] = \angle X_m[n+N-G-n_e] - \angle X_m[n-G-n_e] + \qquad (8)$$

$$\frac{2\pi k_e[n+N-G-n_e]}{N} - \frac{2\pi k_e[n-G-n_e]}{N} +$$

$$\angle W_m[n+N-G-n_e] - W_m[n-G-n_e] = 2\pi k_e +$$

$$\angle W_m[n+N-G-n_e] - \angle W_m[n-G-n_e]$$

In Equation (8), $G_m[n]$ and $R_m[n]$ have the values shifted by $n_e$ from their original values, so that the range of $X_m[n+Nn+G-n_e]$ and $X_m[n-G-n_e]$ becomes $n=n_e$, $n_e+1, \ldots, G-1$, and $n=0, 1, 2, \ldots, G-n_e-1$ for the negative number. Hence, if an approximate range of the timing error of the system is known, the frequency offset is calculated in the interval from which the range is excluded. For example, if the maximum timing error does not exceed 'a', the frequency offset can be estimated using Equation (9) below by calculating the phase difference in the interval of $n=a$, $a+1, \ldots, G-a-2, G-a-1$, and calculating the average value.

$$k_e = \frac{\mathrm{avg}[\angle R_m[n] - \angle G_m[n]]}{2\pi} \qquad (9)$$

Equations (2) to (9) are used when the first carrier synchronizer 223 performs carrier synchronization by estimating the approximate frequency offset. The first carrier synchronizer 223 has the better performance when the used guard interval becomes longer and the timing error of the system has the narrower range. Otherwise, the frequency offset measuring interval becomes shorter, so that the first carrier synchronizer is more affected by the noises and has a difficulty in correctly measuring the frequency offset. After the approximate carrier synchronization, a guard interval remover 225 removes the guard interval from the received data output from the first carrier synchronizer 223 and outputs the guard interval-removed data to a fast Fourier transform (FFT) section 227. The FFT 227 receives the guard interval-removed OFDM symbol, performs the FFT operation on the received OFDM symbol and outputs the original data symbol.

A second carrier synchronizer 229 receives the data symbol FFT-transformed by the FFT 227 and performs fine carrier synchronization on the received data symbol. Specifically, the second carrier synchronizer 229 detects the pilot symbol of the symbol unit from the data symbol stream, and calculates a phase of the detected pilot symbol. The second carrier synchronizer 229 estimates the fine frequency offset by calculating a phase difference between the calculated phase of the pilot symbol and a known phase of a pilot symbol. After estimation of the fine frequency offset, the second carrier synchronizer 229 performs fine carrier synchronization by compensating for the estimated fine frequency offset.

An operation of the second carrier synchronizer 229 will be mathematically described below. For the data symbol output from the FFT 227, a frequency offset according to the FFT characteristics is a shift timing error of the signal and is converted to a variation of the phase. This can be expressed by Equation (10) below.

$$y'_m[k] = X_m[k-k_i] \cdot e^{\frac{j2\pi[k-k_i]n_e}{N}} \cdot e^{\frac{j2\pi k_i m[N+G]}{N}} \cdot \qquad (10)$$

$$e^{jP_e} + W_m[k-k_i] = X_m[k-k_i] \cdot$$

$$e^{\frac{j2\pi k n_e}{N}} \cdot e^{\frac{j2\pi k_i n_e}{N}} \cdot e^{\frac{j2\pi k_i m[N+G]}{N}} \cdot W_m[k-k_i]$$

where $k_i$ denotes the fine frequency offset.

If only the pilot symbol is detected from the received data, the range of m is 0, 1-1, 21-1, 31-1, . . . , where l denotes a period for inserting the pilot symbol of the symbol unit.

The phase difference of the received pilot symbol is calculated by Equation (11) below.

$$\angle y'_m[k] = \qquad (11)$$

$$\angle X_m[k-k_i] + \frac{2\pi n_e}{N}k - \frac{2\pi n_e k_i}{N} + \frac{2\pi k_i m[N+G]}{N} + P_e + \angle W_m[k-k_i]$$

In Equation (11), the second term is expressed in terms of a specific variation of the phase according to an index k, the next three terms are expressed in terms of a constant phase offset, and the last term is expressed in terms of a variation of the phase. If the transmitter continuously uses the same pilot symbol and the time error, the common phase error and the frequency offset are identical during the pilot symbol insertion period, then a phase difference between consecutive two pilot symbols $Y_{mpi}'(k)$ and $Y_{mpi+1}$ is calculated by $$\mathit{diff}_{phase} = \angle y'_{m\pi+1}[k] - \angle y'_{m\pi}[k] = \qquad (12)$$

$$\angle X_{m\pi+1}[k-k_i] - \angle X_{m\pi}[k-k_i] +$$

$$\frac{2\pi k_i m_{\pi+1}[N+G]}{N} - \frac{2\pi k_i m_\pi^o[N+G]}{N} +$$

$$\angle W_{m_{\pi+1}}[k-k_i] - \angle W_{m_\pi}[k-k_i]$$

If the transmitter uses the same pilot symbol as stated above, the first term and the second term have the same value. Hence, Equation (12) can be expressed by Equation (13) below.

$$\mathit{diff}_{phase} = [m_{\pi+1} - m_\pi]\frac{2\pi k_i[N+G]}{N} + \qquad (13)$$

$$\angle W_{m_{\pi+1}}[k-k_i] - \angle W_{m_\pi}[k-k_i] =$$

$$l\frac{2\pi K_i[N+G]}{N} + \angle W_{m_{\pi+1}}[k-k_i] -$$

$$\angle W_{m_\pi}[k-k_i]$$

In Equation (13), the first term is expressed in terms of a constant for N samples of one pilot symbol, and the other terms are expressed in terms of a variation due to the noises. Hence, by calculating an average value of the phase differences for N samples, it is possible to obtain the constant of the first term, from which the influence of the noises is almost removed. From this value, it is possible to calculate a fine frequency offset $k_i$ in accordance with Equation (14) below.

$$k_e = \frac{\text{avg } \text{diff}_{phase} \times N}{2\pi[N+G] \times I} \quad (14)$$

After calculating the fine frequency offset using Equation (14), the second carrier synchronizer 229 performs carrier synchronization by compensating for a frequency offset of the OFDM symbol based on the calculated frequency offset, and provides its output to a despreader 231. The despreader 231 despreads the fine frequency-synchronized received data.

The detailed structure of the first carrier synchronizer 223 and the second carrier synchronizer 229 will be described with reference to FIGS. 6 and 7. Specifically, FIG. 6 illustrates the detailed structure of the first carrier synchronizer of FIG. 5, and FIG. 7 illustrates the detailed structure of the second carrier synchronizer of FIG. 5.

Figure 6:
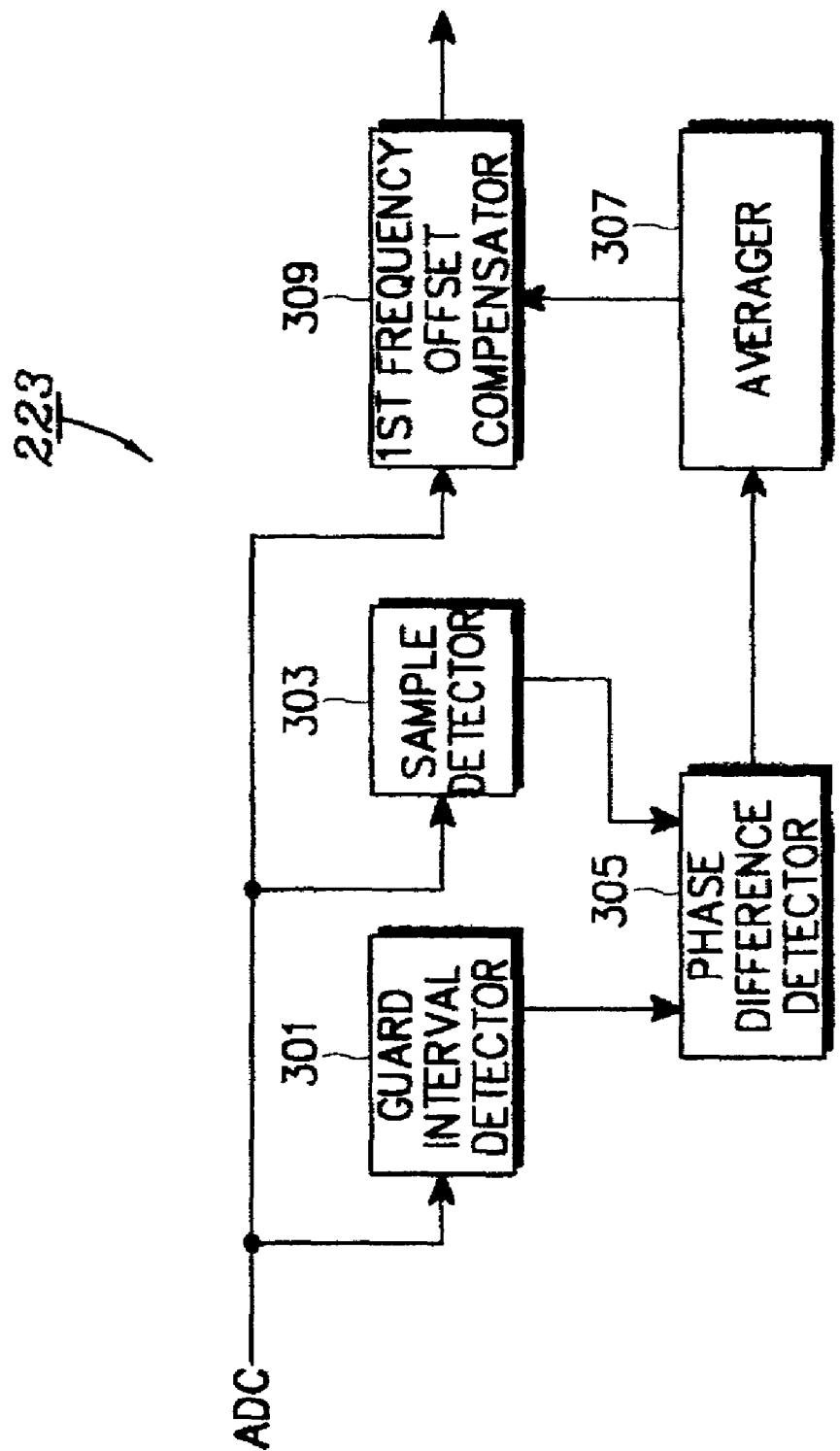
FIG. 6 is a diagram illustrating a detailed structure of the first carrier synchronize of FIG. 5.

In FIG. 6, a guard interval detector 301 receives the OFDM symbol stream including the respective guard intervals, output from the ADC 221 of FIG. 5, detects the respective guard intervals $G_m[n]$ included in the OFDM symbol stream, and calculates phases of the respective guard intervals $G_m[n]$. A copied sample detector 303 receives the OFDM symbol stream, detects data samples (hereinafter, referred to as "copied data samples") of the OFDM symbol copied to create the guard intervals $G_m[n]$ to be detected, and calculates phases of the copied data samples. In Equations (2) to (9), the copied data samples are indicated by $R_m[n]$. A phase difference detector 305 calculates phase differences between the data samples of the guard intervals $G_m[n]$ output from the guard interval detector 301 and the copied data samples $R_m[n]$ output from the copied sample detector 303, and outputs the detected phase differences to an averager 307. The averager 307 calculates an approximate frequency offset by averaging the phase differences output from the phase difference detector 305 in a unit of G (=R), and outputs an approximate frequency offset compensation signal to a first frequency offset compensator 309. The first frequency offset compensator 309 receives the OFDM symbol stream including the guard intervals output from the ADC 221, and compensates for the approximate frequency offset of the OFDM symbol stream according to the approximate frequency offset compensation signal output from the averager 307.

Figure 7:
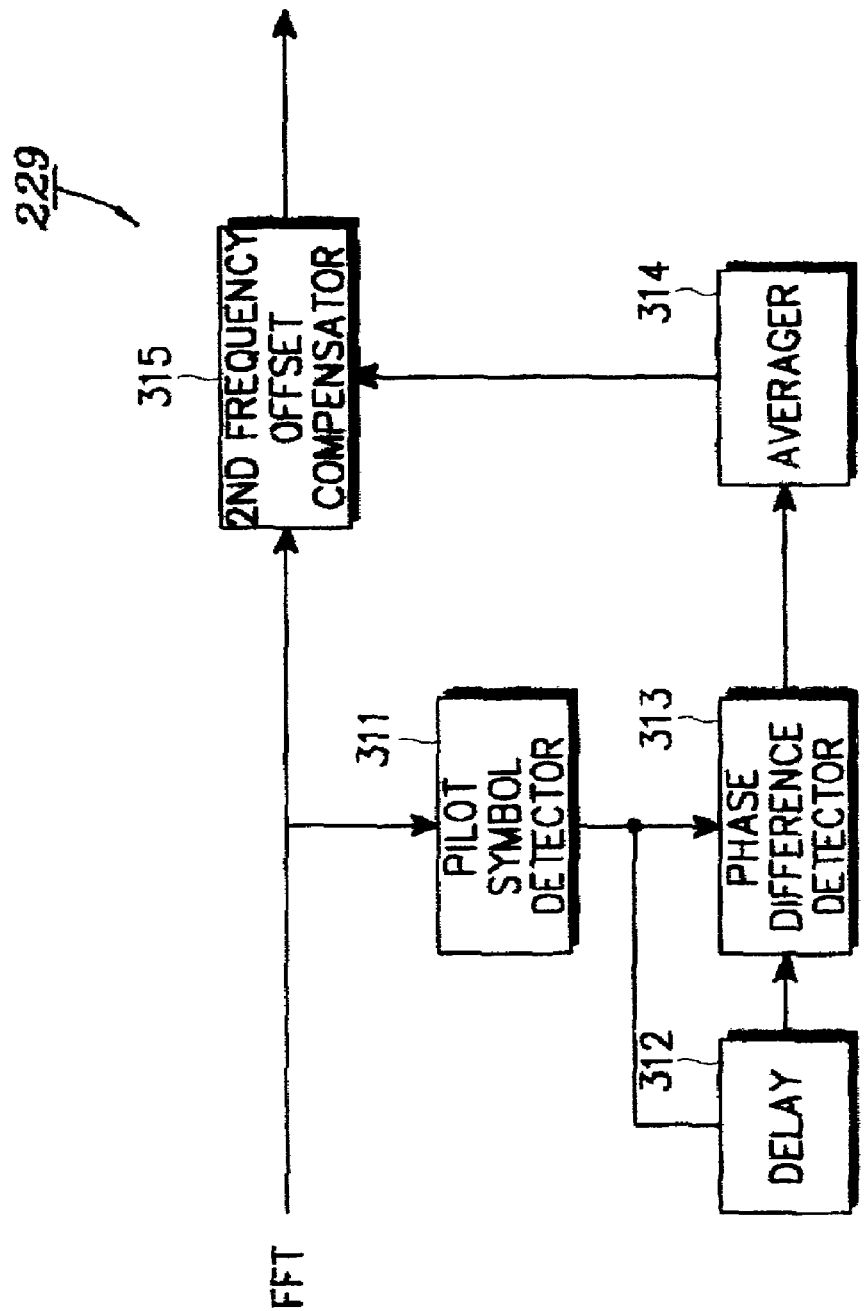
FIG. 7 is a diagram illustrating a detailed structure of the second carrier synchronizer of FIG. 5.

In FIG. 7, a pilot symbol detector 311 receives IFFT-transformed received data output from the FFT 227, and detects a pilot symbol included in the received data. The pilot symbol output from the pilot symbol detector 311 is applied to a delay 312 and a phase difference detector 313. The delay 312 buffers the detected pilot symbol, delays the buffered pilot symbol by the pilot symbol insertion period, and then outputs the delayed pilot symbol to a phase difference detector 313. The phase difference detector 313 receives the pilot symbol detected by the pilot symbol detector 311 and the pilot symbol delayed by the symbol insertion period from the detected pilot symbol, output from the delay 312, calculates phase differences between the corresponding samples of the two pilot symbols, and outputs the calculated phase differences to an averager 314. The averager 314 estimates the fine frequency offset by calculating an average value of the phase differences in the pilot symbol period. After estimation of the fine frequency offset, the averager 314 outputs a fine frequency offset compensation signal for the fine frequency offset to a second offset compensator 315. The second offset compensator 315 receives the FFT-transformed received data from the FFT 327, and compensates for a fine frequency offset of the received data according to the fine frequency offset compensation signal output from the averager 314.

As described above, the invention can compensate for a frequency offset even in a situation where the timing error is not compensated for, and increase the accuracy of frequency offset estimation by removing the influence of the variation due to the noises.

What is claimed is:

1. An apparatus for compensating a frequency offset using a pilot symbol for a receiver in an OFDM/CDMA system including a transmitter for inserting a pilot symbol in a data symbol of frame unit in a specific pattern before transmission, comprising:

a carrier synchronizer for compensating for a fine frequency offset using the pilot symbol inserted in the specific pattern of an IFFT-transformed data symbol stream, wherein the carrier synchronizer comprises:

a pilot symbol detector for detecting a pilot symbol from an OFDM-demodulated data symbol stream;

a delay for delaying the detected pilot symbol by a predetermined time;

a phase difference detector for detecting a phase of the pilot symbol output from the pilot symbol detector and a phase of the delayed pilot symbol output from the delay, and calculating a phase difference between the two pilot symbols;

an averager for calculating a fine frequency offset by averaging the phase differences in a frame unit and outputting a second frequency offset compensation signal according to the fine frequency offset; and a second frequency offset compensator for compensating for a fine frequency offset of the demodulated data symbol according to the second frequency offset compensation signal.

2. An apparatus for compensating for a frequency offset using a pilot symbol for a receiver in an OFDM/CDMA system including a transmitter for inserting a pilot symbol in a data symbol stream of a frame unit in a specific pattern before transmission, comprising:

a first carrier synchronizer for receiving an OFDM symbol stream including received guard intervals and performing approximate frequency synchronization on the received OFDM symbol stream using the guard intervals;

a guard interval remover for removing the guard intervals from the OFDM symbol stream after performing frequency synchronization;

a fast Fourier transform (FFT) section for performing an FFT operation on the guard interval-removed OFDM symbol stream and outputting a data symbol stream; and a second carrier synchronizer for compensating for a fine frequency offset using the pilot symbol inserted in the data symbol stream in the specific pattern.

3. The apparatus as claimed in claim 2, wherein the first carrier synchronizer comprises:

a guard interval detector for detecting a guard interval from the OFDM symbol stream;

a copied sample detector for detecting data samples copied to create the detected guard interval, from the OFDM symbol stream;

a phase difference detector for calculating a phase of the data samples of the detected guard interval and a phase of the copied data samples, and calculating a phase difference between the two data samples;

an averager for calculating a frequency error by averaging the phase differences output from the phase difference detector in the frame unit, and outputting a first frequency offset compensation signal according to the frequency offset; and a first frequency offset compensator for compensating for a frequency offset of the OFDM symbol according to the first frequency offset compensation signal.

4. The apparatus as claimed in claim 2, wherein the second carrier synchronizer comprises:

a pilot symbol detector for detecting the pilot symbol from the data symbol stream;

a delay for delaying the pilot symbol by a pilot symbol insertion period;

a phase difference detector for detecting a phase of a pilot symbol output from the pilot symbol detector and a phase of the delayed pilot symbol output from the delay, and calculating a phase difference between the two pilot symbols;

an averager for calculating a fine frequency offset by averaging the phase differences received in the frame unit, and outputting a second frequency offset compensation signal according to the fine frequency offset; and a second frequency offset compensator for compensating a fine frequency error of the demodulated data symbol according to the second frequency offset compensation signal.

5. The apparatus as claimed in claim 4, wherein the fine frequency offset is calculated by $$k_e = \frac{\text{avg } diff_{phase} \times N}{2\pi[N+G] \times I}.$$

* * * * *